(12) United States Patent
Donnenhoffer (10) Patent No.: US 6,981,583 B1
(45) Date of Patent: Jan. 3, 2006

(54) FLUID OPERATED SELF CENTERING CONVEYOR ROLLER

(75) Inventor: James J. Donnenhoffer, Terre Haute, IN (US)

(73) Assignee: Ultra Design and Engineering LLC, Noblesville, IN (US)

( * ) Notice: Subject to any disclaimer, the term of this patent is extended or adjusted under 35 U.S.C. 154(b) by 0 days.

(21) Appl. No.: 10/910,116

(22) Filed: Aug. 3, 2004

(51) Int. Cl.
*B65G 39/16* (2006.01)

(52) U.S. Cl. .................... 198/807; 198/810.03

(58) Field of Classification Search ........... 198/807, 198/810.03
See application file for complete search history.

(56) References Cited

U.S. PATENT DOCUMENTS

| | | | |
|---|---|---|---|
| 3,751,122 A * | 8/1973 | Dubay | 384/296 |
| 5,503,265 A * | 4/1996 | Hussar et al. | 198/807 |
| 5,833,106 A | 11/1998 | Harris | |
| 5,833,171 A | 11/1998 | Harris | |
| 5,899,321 A * | 5/1999 | El-Ibiary | 198/807 |
| 6,131,726 A * | 10/2000 | Hovsto et al. | 198/806 |
| 6,237,752 B1 * | 5/2001 | El-Ibiary | 198/810.03 |
| 6,402,005 B1 * | 6/2002 | Huttelmaier et al. | 226/23 |
| 6,575,857 B2 * | 6/2003 | Sebright et al. | 474/106 |
| 6,594,460 B1 * | 7/2003 | Williams et al. | 399/165 |
| 6,627,044 B2 * | 9/2003 | Suortti et al. | 162/273 |
| 6,668,526 B2 | 12/2003 | Schmidt | |
| 6,712,200 B2 * | 3/2004 | Ubaldi | 198/810.03 |
| 6,776,280 B2 * | 8/2004 | Hovst.o slashed. et al. | 198/806 |

FOREIGN PATENT DOCUMENTS

EP                522262 A1  *  1/1993

\* cited by examiner

*Primary Examiner*—Richard Ridley
(74) *Attorney, Agent, or Firm*—Woodard, Emhardt, Moriarty, McNett & Henry LLP (57) ABSTRACT

A roller for centering a conveyor belt thereon. The roller includes opposite end portions associated with fluid pressurized bladders that are squeezed and distorted as the roller assumes a skewed position as the conveyor belt moves off center on the roller. The roller is urged back to its original position by the bladders along with belt tension recentering the belt.

16 Claims, 6 Drawing Sheets

FLUID OPERATED SELF CENTERING CONVEYOR ROLLER

BACKGROUND OF THE INVENTION

The present invention relates generally to the field of conveyor belts.

DESCRIPTION OF THE PRIOR ART

Many conveyors incorporate a continuous looped belt extending around and supported by a plurality of rollers. Through continued use, the belt may become misaligned or off center relative to the rollers resulting in damage to the edged portion of the belt and even stoppage of the conveyor. Further, articles conveyed by the belt are subjected to movement along a line other than the longitudinal axis of the conveyor. Thus, it is the practice to periodically stop the conveyor in order to realign the belt relative to the central axis of the conveyor resulting in down time and added cost.

In order to solve the aforementioned problem, a variety of self correcting or self centering devices have been incorporated into conveyers in an attempt to automatically align the belt. One such device is shown in the U.S. Pat. No. 6,668,526 issued to Josef Schmidt. The Schmidt device includes a tracking roller pivotally mounted to a frame to adjust the flow path of the web of material in a packaging machine. Another approach is disclosed in U.S. Pat. No. 5,833,171 issued to J. C. Harris. In the Harris device, a rotating sleeve is coaxially mounted upon an inner non-rotating but pivoting sleeve. As the web runs over the rotating sleeve, any imbalance in lateral web tension will cause the non-rotating pivoting sleeve to pivot at its center with respect to the longitudinal axis of the shaft permitting the non-rotating pivoting sleeve and coaxial rotating sleeve to pivot on the side of least tension until the web tension is equalized across the coaxial sleeve. J. C. Harris also discloses in his U.S. Pat. No. 5,833,106 a similar web tension equalizing roll and tracking apparatus wherein the equalizing roll has a common axis with a shaft mounted horizontally on two bearings for rotation.

SUMMARY OF THE INVENTION

One embodiment of the present invention is a conveyor for moving articles along a direction of travel comprising an endless belt extending in a closed loop with a first loop end and an opposite second loop end forming an entrance to and an exit from the conveyor to convey articles along a direction of travel therebetween. A plurality of rollers extend across the direction of travel. The rollers are located between the first loop end and the second loop end and around which the belt extends and is supported. A belt centering roller has an axis of rotation extending perpendicularly across the direction of travel and is located at the second loop end around which the belt extends. The belt centering roller has a first end portion and a second end portion. A pair of supports rotatably mount the first end portion and the second end portion to a frame to allow the belt centering roller to move in response to belt pressure from a perpendicular position relative to the direction of a travel to a skewed position relative to the direction of travel. The pair of supports normally urge the belt centering roller away from the skewed position toward the perpendicular position centering the belt thereon.

It is an object of the present invention to provide a device for automatically centering a conveyor belt on a conveyor.

A further object of the present invention is to provide a fluid operated self-centering conveyor roller.

In addition, it is an object of the present invention to provide a conveyor having a device for centering a conveyor belt on the conveyor.

Related object and advantages of the present invention will be apparent from the following description.

DESCRIPTION OF THE PREFERRED EMBODIMENTS

For the purposes of promoting an understanding of the principles of the invention, reference will now be made of the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
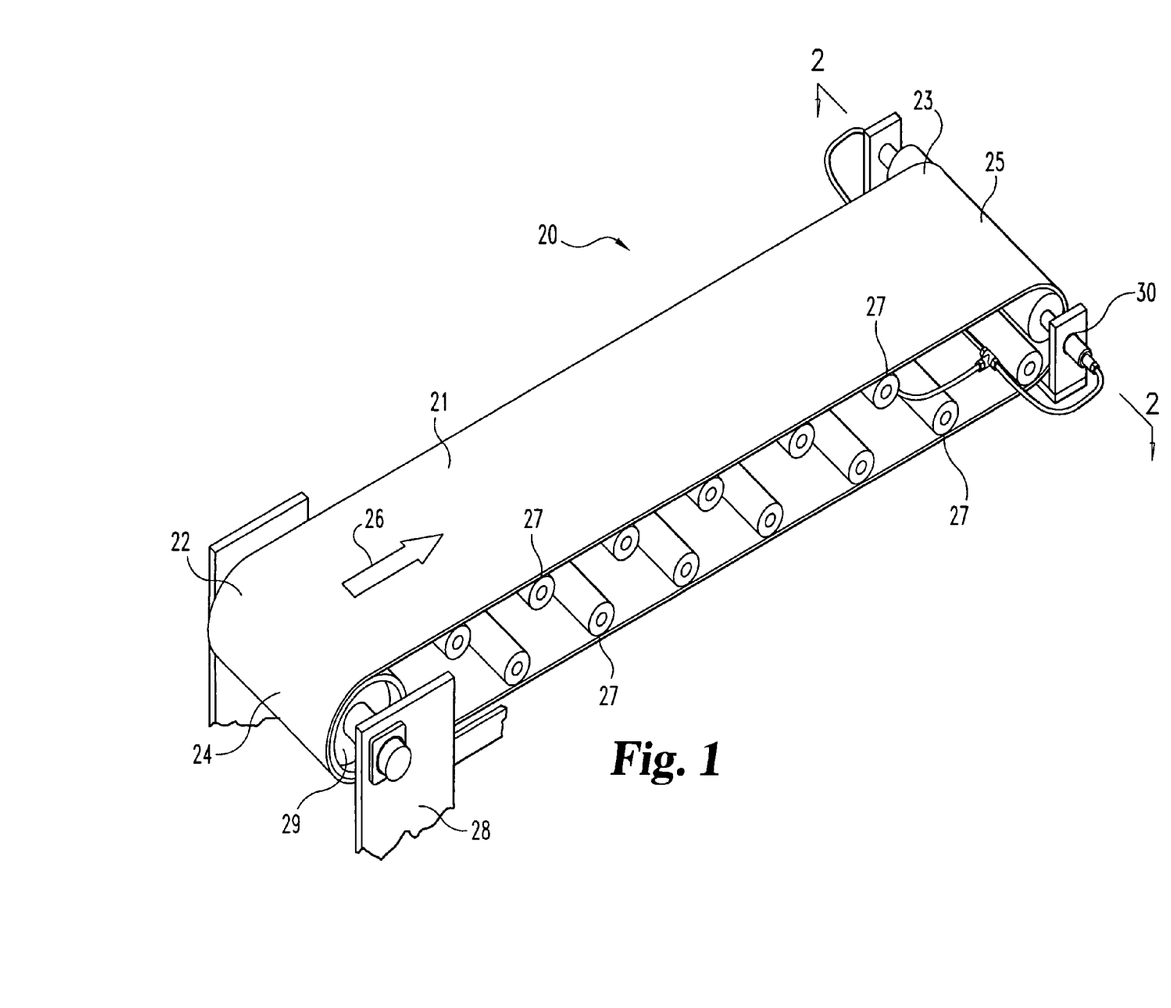
FIG. 1 is a perspective view of a conveyor incorporating the present invention.

Referring now more particularly to FIG. 1, there is shown a conveyor 20 having an endless conveyor belt 21 with a first loop end 22 and opposite second loop end 23 forming respectively the entrance 24 and exit 25 of the conveyor. Articles resting atop belt 21 are conveyed from the conveyor entrance 24 to the conveyor exit 25 in the direction of arrow 26. A plurality of conventional rollers 27 are rotatably mounted to the conveyor frame 28. Rollers 27 extend across in perpendicular fashion to the direction of travel 26 with belt 21 extending around the rollers.

Roller 29 located at loop end 22 may be connected to a conventional drive mechanism to cause the conveyor to rotate in a clockwise direction as viewed in FIG. 1. At the opposite end 23 of the conveyor is located a belt centering device 30 for automatically centering belt 21 with respect to the conveyor and rollers 27.

Belt centering device 30 (FIG. 2) includes a belt-centering roller 31 having an axis of rotation 32 extending longitudinally through the center of the roller. Axis 32 extends perpendicular across the direction of travel 26 (FIG. 1).

Figure 3:
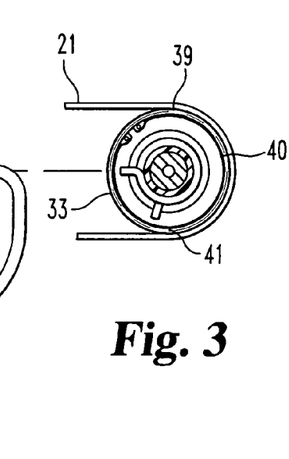
FIG. 3 is an end cross-sectional view taken along the line 3—3 of FIG. 2 and viewed in the direction of the arrows.

Roller 31 has an outer circumferentially extending cylindrical surface 33 (FIG. 3) with belt 21 being in contact with surface 33 as the belt extends across the top 39, side 40, and bottom 41 of the roller. Belt 21 extends around roller 31 through an angle of approximately 180 degrees as the belt extends from top 39 to bottom 41 of the roller. The belt is in continuous contact with the roller between the top portion 39 of the roller and bottom portion 41 with the belt being in contact with approximately one-half of the circumferential surface 33 as the belt extends around the roller.

Roller 31 is hollow having a pair of opposite end portions 34 and 35 rotatably mounted respectively to axles 42 and 43. Axles 42 and 43 are respectively fixedly secured to upstanding brackets 36 and 37 (FIG. 2) mounted atop plate 38, in turn, fixedly secured to frame 28.

Each end portion 34 and 35 is recessed and receives a conventional bearing rotatably receiving a bladder housing. An inflatable fluid pressurized bladder is located within the bladder housing and, in turn, is sealingly mounted to the axle. End portion 35 (FIG. 4) will now be described it being understood that an identical description applies to end portion 34.

Figure 4:
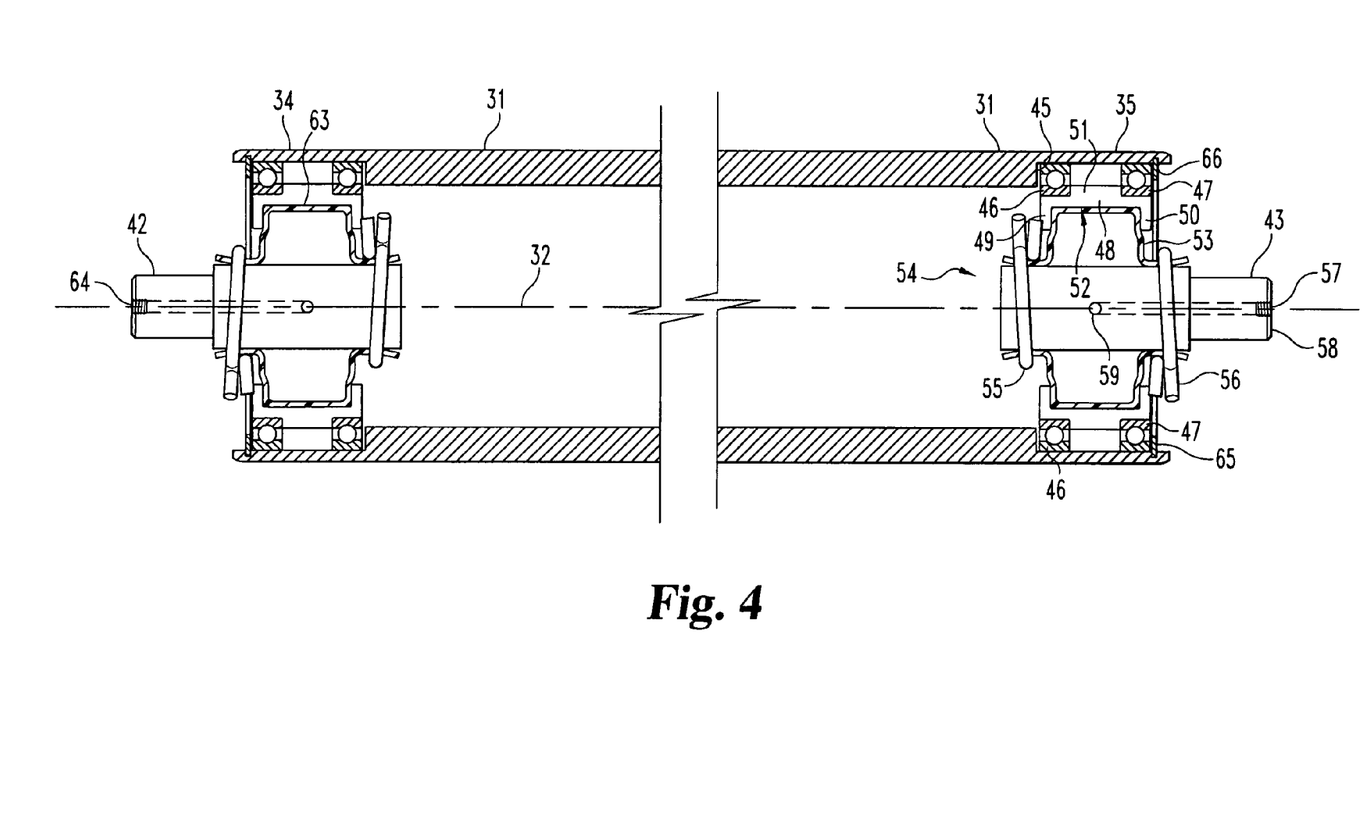
FIG. 4 is an enlarged fragmentary cross-sectional view taken along the line 4—4 of FIG. 2 and viewed in the direction of the arrows.

End portion 35 includes a recess 45 in which are located a pair of spaced apart bearings 46 and 47 each extending around the longitudinal axis 32 of the roller. Bladder housing 48 includes a pair of side portions 49 and 50 aligned with bearings 46 and 47 and extends around axis 32. A conventional snap ring 65 is removably mounted to continuous recess 66 in end portion 45. Recess 66 extends continuously around axis 32 allowing the C-shaped snap ring 65 to be inserted therein immediately adjacent bearing 47 thereby holding the bearings, bladder housing and bladder in place. Ridge 51 of housing 48 projects between bearings 46 and 47 spacing the bearings apart. A continuous recess 52 opens inwardly towards axis 32 and is positioned between side portions 49 and 50 to receive a fluid pressurizable bladder 53.

Bladder 53 is donut shaped having a central hole 54 through which axle 43 extends. Bladder 53 flares outwardly surrounding hole 54 and is sealingly clamped to axle 43 by a pair of wire clamps 55 and 56. Bladder 53 extends completely around axis 32 and projects into recess 52.

Axle 43 includes a fluid passage 57 extending from the end 58 of the axle to location 59 whereat the passage opens into bladder 53 allowing control of the fluid pressure within the bladder.

End portion 34 includes a bladder 63 identical to bladder 53 with bladder 63 being mounted to axle 42 by wire clamps and contained within a bladder housing, in turn, bearingly received by bearings provided in end portion 34 in a manner identical to that previously described for end portion 35. Axle 42 includes a passage 64 identical to passage 57 to allow control of the fluid pressure within bladder 63.

A pair of fluid lines 60 and 61 (FIG. 2) are connected respectively to passages 64 and 57 with the opposite ends of lines 60 and 61 connected to a conventional fluid pressure valve 62, in turn, connectable to a source of fluid pressure. Lines 60 and 61 are in fluid communication with each other thereby equalizing the fluid pressure within each line and also equalizing the fluid pressure within bladders 63 and 53.

In operation, roller 31 is freely rotatably upon axles 42 and 43 which are stationary. Likewise, bladders 53 and 63 along with the respective bladder housings do not rotate.

Figure 5:
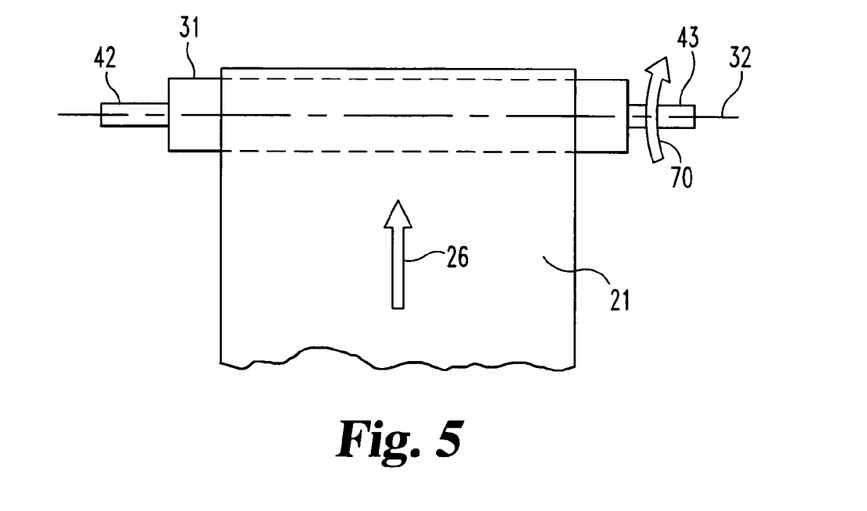
FIG. 5 is an enlarged fragmentary top view of the exit end of the conveyor illustrating the conveyor belt centered on the conveyor.

FIG. 5 illustrates conveyor belt 21 extending around roller 31. With conveyor belt 21 moving in the direction of arrow 26, roller 31 is caused to rotate in the direction of arrow 70 about axis of rotation 32 with belt 21 being located equidistant between the opposite ends of the roller at the same time the bladders are not distorted and remain as shown in FIG. 4.

Figure 2:
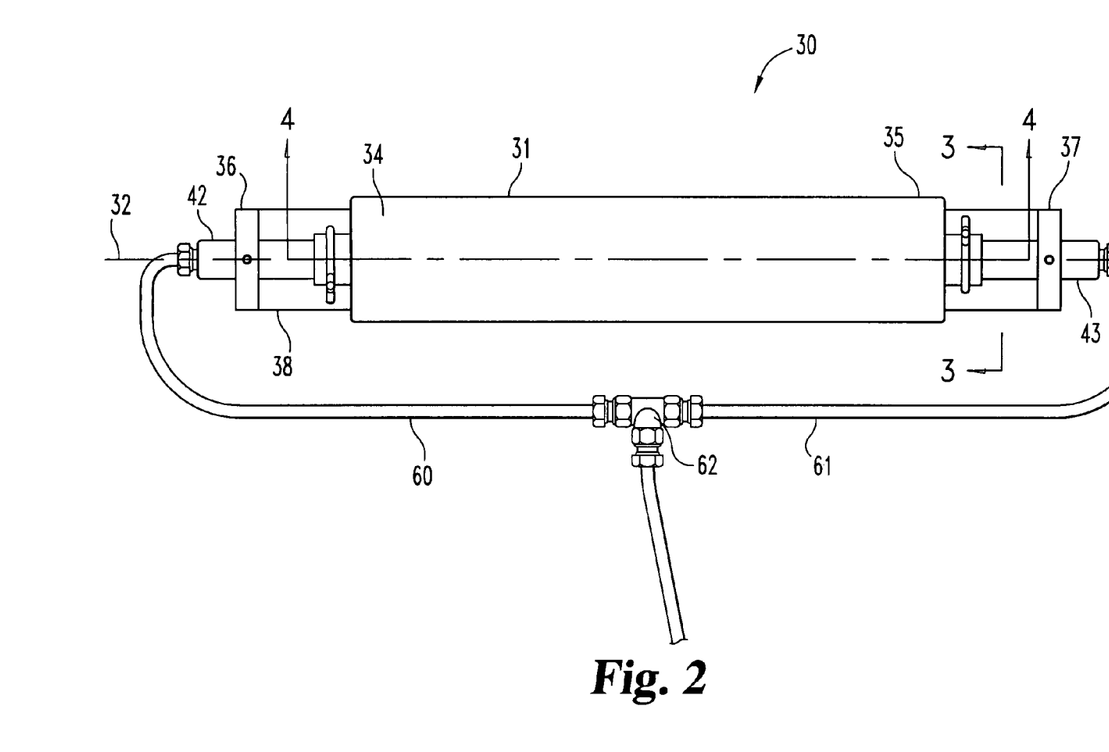
FIG. 2 is an enlarged cross-sectional view taken along the line 2—2 of FIG. 1 and viewed in the direction of the arrows.
Figure 6:
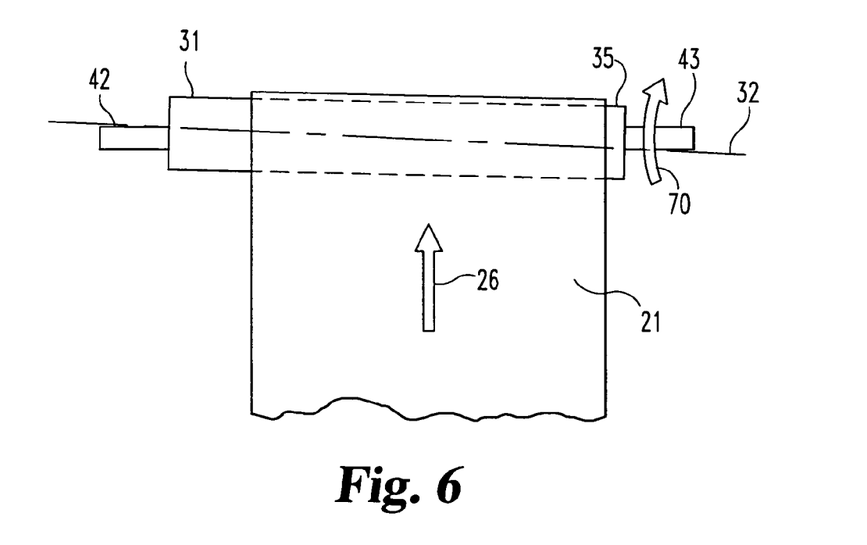
FIG. 6 is the same view as FIG. 5 only illustrating the conveyor belt located off center relative to the conveyor.

In the event belt 21 becomes off center with respect to roller 31 as illustrated in FIG. 6, the belt will move closer to one end of the roller than the opposite end. For example, belt 21 is shown in FIG. 6 as being closer to end 35 as compared to end 34 of roller 31. As the belt shifts to the right as viewed in FIG. 6, the belt exerts force on roller 31 to cause end 35 to move toward the opposite end or entrance end of the conveyor with end portion 34 of roller 31 moving in the opposite direction. At the same time, axles 42 and 43 and held stationary in brackets 36 and 37 (FIG. 2). Thus, bladders 53 and 63 are squeezed from their normal position depicted in FIG. 4 to a cocked position depicted in FIG. 7 as the roller cocks relative to axles 42 and 43.

Figure 7:
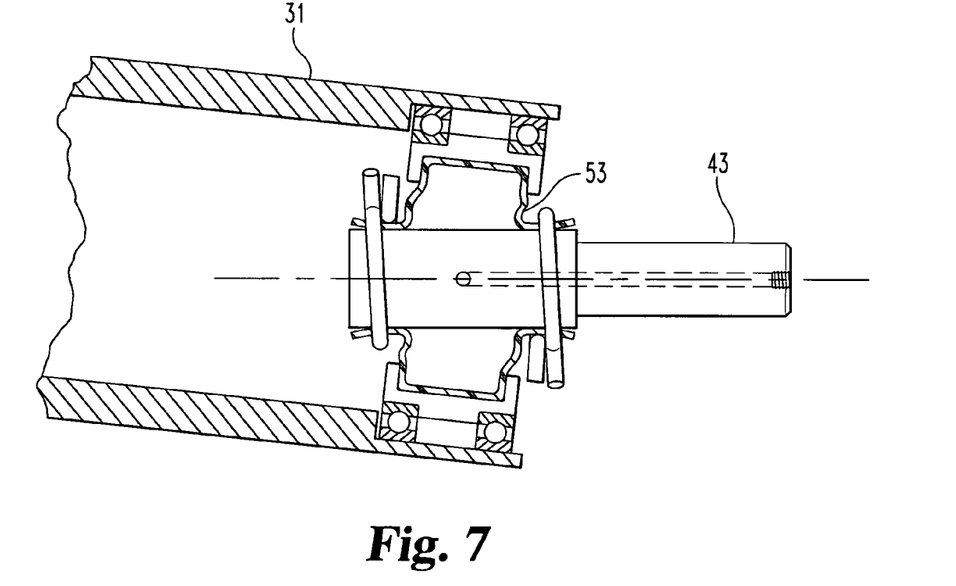
FIG. 7 is a fragmentary cross-sectional view of the right end of the centering roller of FIG. 6 illustrating the skewed position of the roller and the deformation of the bladder.
Figure 8:
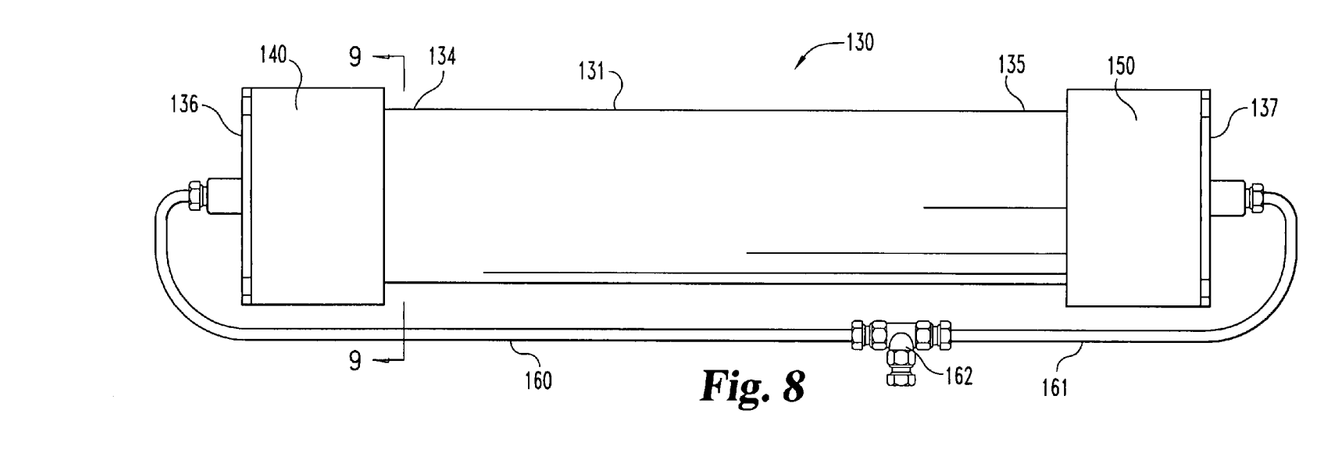
FIG. 8 is the same view as FIG. 2 only showing an alternate embodiment of the centering roller.
Figure 9:
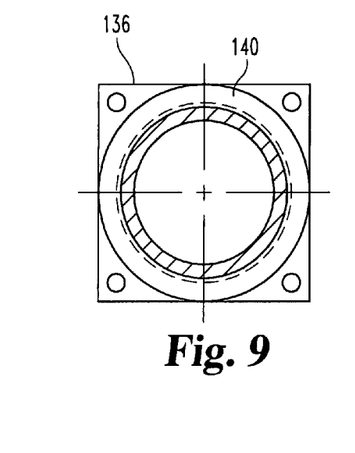
FIG. 9 is a cross-sectional view taken along the line 9—9 of FIG. 8 and viewed in the direction of the arrows.
Figure 10:
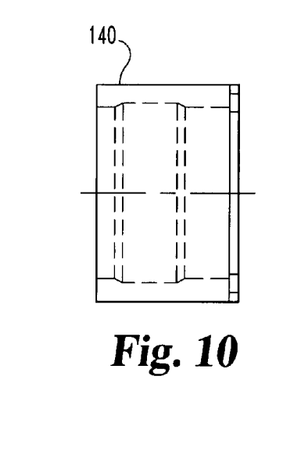
FIG. 10 is a side view of the outer mount.
Figure 11:
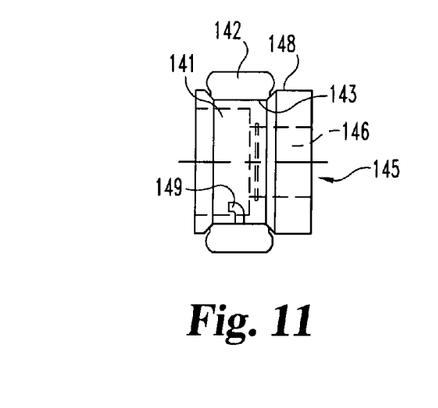
FIG. 11 is a side view of the inner hub, bladder and bearings.

Fluid pressure within the bladders remain equal and constant causing the cylinder to revert back from the cocked position of FIG. 7 to its original position of FIG. 4 with the central axis of cylinder 31 being coincident with the axis extending through axles 42 and 43. As cylinder 31 moves to its original uncocked position relative to the axles, the belt moves back to its original position located equidistant between the opposite ends of the cylinder. Thus, the supporting structure including axles 42 and 43, bladders 63 and 53 and the bladder housings provide a supporting structure or means to normally urge the belt centering roller away from the skewed position of FIG. 6 to the perpendicular position relative to the direction of travel 26 illustrated in FIG. 5 thereby centering the belt on the roller and on the conveyor.

An alternate embodiment of the web-centering roller is illustrated in FIGS. 8–11. Centering roller 130 operates in the manner identical to the operation of roller 30. Centering roller 130 includes a cylindrical main body 131 with opposite end portions 134 and 135 rotatably mounted to a pair of upstanding brackets 136 and 137, in turn, mounted to a plate affixed to frame 28 (FIG. 1). A pair of fluid lines 160 and 161 are connected to a fluid pressure valve 162, in turn, connected to a source of fluid pressure with the opposite ends of the lines connected through the mounting brackets to bladders positioned externally of the cylindrical main body 131.

End 134 of centering roller 131 will now be described it being understood that an identical description applies to end 135. End 134 includes an outer mount or hub 140 fixedly mounted to the upstanding bracket 136. Mount 140 may be secured to bracket 136 by means of welds or other conventional fastening means.

Mount 140 is hollow and receives an inner hub 141 having a bladder 142 mounted thereto. Bladder 142 extends continuously around recess 143 of hub 141 and includes a fluid communication line 149 extending through bracket 136 and connected to line 160.

Hub 141 has a hollow center 145 in which is located conventional ring shaped bearings 146 into which an end of cylinder 131 projects. The end 134 of roller 131 has a reduced diameter to project into bearing 146 thereby rotatably mounting roller 131 to the hub. Hub 141 and bladder 142 float within outer hub 140; however, the fluid pressurized bladder 142 keeps the hub in place relative to mount 140 thereby preventing relative rotational motion therebetween.

In operation, movement of the belt across the top, side and bottom surface of roller 131 causes the roller to rotate within the bearings receiving the opposite ends of the roller. At the same time, the hub 141, bladder 142 and mount 140 and the hub and bladder within mount 150 do not rotate. Outer mount 150 is constructed identically to mount 140 and contains an identical hub and bladder as compared to hub 141 and bladder 142.

Centering roller 130 operates in a manner identical to roller 30 even though the bladders are located externally of roller 131 as compared to the bladders located internally in roller 31. Thus, as the belt moves toward the right ed of roller 131 as viewed in FIG. 8, the end portion 135 of roller 131 will move toward the entrance of the conveyor while the opposite end portion 134 of the roller moves in an opposite direction thereby deforming each bladder as previously described and illustrated in FIG. 7. The bladders temporarily deform or distort by the bladder side walls stretching and collapsing from their original shapes. For example, bladder 53 is shown in FIG. 7 as having a right side wall in partially collapsed condition while the left side wall is shown as stretched from its original position of FIG. 4. Since the fluid pressure within the bladders positioned adjacent the opposite ends of roller 131 is equal and constant due to lines 160 and 161, roller 131 is urged back to its original position extending perpendicularly across the direction of travel 26 thereby re-centering the belt on the roller.

As roller 131 tilts or assumes a skewed position relative to its original axis of rotation that was perpendicular to direction 26, the bladders within the inner hubs squeeze and deform as illustrated in FIG. 7 for the first embodiment. At the same time, the hubs within mounts 140 and 150 positioned externally of the roller 131 also assume a cocked or skewed position thereby resulting in the temporary deformation of the bladders.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A conveyor for moving articles along a direction of travel comprising:
   an endless belt extending in a closed loop with a first loop end and an opposite second loop end forming an entrance to and an exit from said conveyor to convey articles along a direction of travel therebetween;
   a plurality of rollers extending across said direction of travel, said rollers located between said first loop end and said second loop end and around which said belt extends and is supported;
   a frame;
   a belt centering roller having an axis of rotation extending perpendicularly across said direction of travel and located at said second loop end around which said belt extends, said belt centering roller having a first end portion and a second end portion; and,
   a pair of supports rotatably mounting said first end portion and said second end portion to said frame and allowing said belt centering roller to move in response to belt pressure from extending across a perpendicular position relative to said direction of travel to a skewed position relative to said direction of travel by said first end portion moving toward said first loop end while said second end portion moves away from said first loop end as said belt moves off-center on said belt centering roller toward said first end portion and away from said second end portion, said pair of supports mounting said belt centering roller to urge said belt centering roller away from said skewed position toward said perpendicular position centering said belt thereon; and wherein:
   said pair of supports includes a fluid pressurizable first bladder and a fluid pressurizable second bladder positioned respectively at said first end portion and said second end portion of said belt centering roller; and further comprising:
   pressurizable fluid lines connected to and in fluid communication with said first bladder and second bladder, said lines equalizing fluid pressure within said first bladder and said second bladder to urge said belt centering roller to said perpendicular position.

2. The conveyor of claim 1 wherein said pair of supports include:
   a pair of bearings mounted within said first end portion and said second end portion of said belt centering roller;
   a pair of axles mounted to said frame and extending into said first bladder and said second bladder which are positioned between said axles and said bearings, said axles including fluid passages leading from said fluid lines into said first bladder and said second bladder; and further comprising:
   a fluid control valve located in said lines to control fluid pressure within said lines and thus within said first bladder and said second bladder.

3. The conveyor of claim 2 wherein:
   said pair of supports including fasteners sealingly securing and mounting said first bladder and said second bladder to said pair of axles to limit fluid leakage between said first bladder and said second bladder relative to said pair of axles.

4. The conveyor of claim 3 wherein:
   said first bladder and said second bladder are squeezable and distortable as said first end portion and said second end portion of said belt centering roller move relative to said pair of axles under belt pressure moving said belt centering roller between said perpendicular position and said skewed position.

5. The conveyor of claim 4 and further comprising:
   a driver to move said belt around said rollers to convey articles from said entrance to said exit.

6. The conveyor of claim 1 wherein said pair of supports include:
   a pair of outer mounts fixedly mounted on said frame and having hollow centers:
   a pair of inner hubs movably mounted within said hollow centers with said first bladder and said second bladder positioned between said outer mounts and said inner hubs and located external to said belt centering roller, said first bladder and said second bladder are squeezable and distortable as said inner hubs move relative to said outer mounts under belt pressure moving said belt centering roller between said perpendicular position and said skewed position; and,
   a pair of bearings mounted at said first end portion and said second end portion of said belt centering roller and located between said inner hubs and said first end portion and said second end portion allowing said belt centering roller to rotate while said inner hubs and said mounts remain non-rotatable.

7. The conveyor of claim 6 and further comprising:
   a fluid control valve located in said lines to control fluid pressure within said first bladder and said second bladder.

8. The conveyor of claim 7 wherein:
said belt-centering roller is located at the exit of the conveyor and has a circumferentially extending outer surface with approximately one half of said outer surface in contact with said belt.

9. A fluid operated device for automatically centering a belt that is movably mounted on a conveyor comprising:
a frame;
a roller with a first end and opposite second end and having an axis of rotation extending therethrough with said roller rotatably mounted to said frame on said axis, said roller having a center equidistant between said first end and said opposite second end; and,
supports mounted to and between said frame and said first end and said second end of said roller to allow said roller to freely rotate on said axis of rotation and become skewed relative to a belt extending thereagainst and moving off-center relative to said center of said roller, said supports urging said roller to move from being skewed to being perpendicular to a belt moving thereagainst positioning said belt equidistant between said first end and said second end of said roller, and wherein said supports include:
a fluid pressurizable first bladder positioned within said first end of said roller;
a fluid pressurizable second bladder positioned within said second end of said roller; and,
pressurizable fluid lines connected to and in fluid communication with said first bladder and said second bladder, said fluid lines equalizing internal fluid pressure of said first bladder and said second bladder.

10. The device of claim 9 wherein:
said first bladder and said second bladder are squeezable and distortable as said roller moves from being skewed relative to said belt as said belt moves off-center on said roller with fluid pressure within said first bladder and said second bladder urging said first bladder and said second bladder from being distortable and moving said roller from skewed positioned to perpendicular to said belt re-centering said belt on said roller.

11. A fluid operated device for automatically centering a belt that is movably mounted on a conveyor comprising:
a frame;
a roller with a first end and opposite second end and having an axis of rotation extending therethrough with said roller rotatably mounted to said frame on said axis, said roller having a center equidistant between said first end and said opposite second end; and,
supports mounted to and between said frame and said first end and said second end of said roller to allow said roller to freely rotate on said axis of rotation and become skewed relative to a belt extending thereagainst and moving off-center relative to said center of said roller, said supports urging said roller to move from being skewed to being perpendicular to a belt moving thereagainst positioning said belt equidistant between said first end and said second end of said roller, said supports include:
a fluid pressurizable first bladder positioned at said first end of said roller;
a fluid pressurizable second bladder positioned at said second end of said roller; and,
pressurizable fluid lines connected to and in fluid communication with said first bladder and said second bladder, said fluid lines equalizing internal fluid pressure of said first bladder and said second bladder,
said supports include outer hubs immovably mounted to said frame outwardly of said first end and said second end of said roller, said supports further include inner hubs mounted within said outer hubs, said first bladder and said second bladder are located externally of said roller and between said outer hubs and said inner hubs, said supports further include bearings within said first end and said second end of said roller that bearingly receive said inner hubs and rotatable mount said roller thereto.

12. The device of claim 11 wherein:
said inner hubs include fluid passages extending therefrom in fluid communication with said first bladder and said second bladder and said fluid lines; and further comprising:
a fluid control valve connected to said lines to control fluid pressure within said first bladder and said second bladder.

13. A conveyor for moving articles along a direction of travel comprising:
an endless belt extending in a closed loop with a first loop end and an opposite second loop end forming an entrance to and an exit from said conveyor to convey articles along a direction of travel therebetween;
a plurality of rollers extending across said direction of travel, said rollers located between said first loop end and said second loop end and around which said belt extends and is supported;
a frame;
a belt centering roller having an axis of rotation extending perpendicularly across said direction of travel and located at said second loop end around which said belt extends, said belt centering roller having a first end portion and a second end portion; and,
mounting means rotatably mounting said first end portion and said second end portion to said frame and allowing said belt centering roller to move in response to belt pressure from extending across a perpendicular position relative to said direction of travel to a skewed position relative to said direction of travel by said first end portion moving toward said first loop end while said second end portion moves away from said first loop end as said belt moves off-center on said belt centering roller toward said first end portion and away from said second end portion, said means including a pair of supports mounting said belt centering roller to urge said belt centering roller away from said skewed position toward said perpendicular position centering said belt thereon; and wherein:
said pair of supports include fluid pressurizable means positioned at said first end portion and said second end portion of said belt centering roller; and further comprising:
pressurizable fluid lines connected to and in fluid communication with said fluid pressurizable means, said lines equalizing fluid pressure within said fluid pressurizable means to urge said belt centering roller to said perpendicular position; and
said fluid pressurizable means is located within said belt centering roller.

14. A conveyor for moving articles along a direction of travel comprising:
an endless belt extending in a closed loop with a first loop end and an opposite second loop end forming an entrance to and an exit from said conveyor to convey articles along a direction of travel therebetween;

a plurality of rollers extending across said direction of travel, said rollers located between said first loop end and said second loop end and around which said belt extends and is supported;

a frame;

a belt centering roller having an axis of rotation extending perpendicularly across said direction of travel and located at said second loop end around which said belt extends, said belt centering roller having a first end portion and a second end portion; and, mounting means rotatably mounting said first end portion and said second end portion to said frame and allowing said belt centering roller to move in response to belt pressure from extending across a perpendicular position relative to said direction of travel to a skewed position relative to said direction of travel by said first end portion moving toward said first loop end while said second end portion moves away from said first loop end as said belt moves off-center on said belt centering roller toward said first end portion and away from said second end portion, said means including a pair of supports mounting said belt centering roller to urge said belt centering roller away from said skewed position toward said perpendicular position centering said belt thereon; and wherein:

said pair of supports include fluid pressurizable means positioned at said first end portion and said second end portion of said belt centering roller; and further comprising;

pressurizable fluid lines connected to and in fluid communication with said fluid pressurizable means, said lines equalizing fluid pressure within said fluid pressurizable means to urge said belt centering roller to said perpendicular position; and said fluid pressurizable means includes a pair of bladders located external to said belt centering roller that receive said first end portion and said second end portion of said belt centering roller, said pressurizable means is located external to said belt centering roller.

15. The conveyor of claim 14 wherein:

said fluid pressurizable means is squeezable and distortable as said first end portion and said second end portion of said belt centering roller move under belt pressure moving said belt centering roller between said perpendicular position and said skewed position.

16. A fluid operated device for automatically centering a belt that is movably mounted on a conveyor comprising:

a frame;

a roller with a first end and opposite second end and having an axis of rotation extending therethrough with said roller rotatably mounted to said frame on said axis, said roller having a center equidistant between said first end and said opposite second end; and, supports mounted to and between said frame and said first end and said second end of said roller to allow said roller to freely rotate on said axis of rotation and become skewed relative to a belt extending thereagainst and moving off-center relative to said center of said roller, said supports urging said roller to move from being skewed to being perpendicular to a belt moving thereagainst positioning said belt equidistant between said first end and said second end of said roller, said supports include a fluid pressurizable first bladder positioned at said first end of said roller and a fluid pressurizable second bladder positioned at said second end of said roller, said first bladder and said second bladder are in fluid communication with each other equalizing internal fluid pressure of said first bladder and said second bladder urging said roller to move from being skewed to being perpendicular to a belt moving there against positioning said belt equidistant between said first end and said second end of said roller.

\* \* \* \* \*